July 26, 1932.　　　L. C. BAYLES　　　1,868,684
CLEANSING FLUID CONVEYING TUBE
Filed Oct. 26, 1928
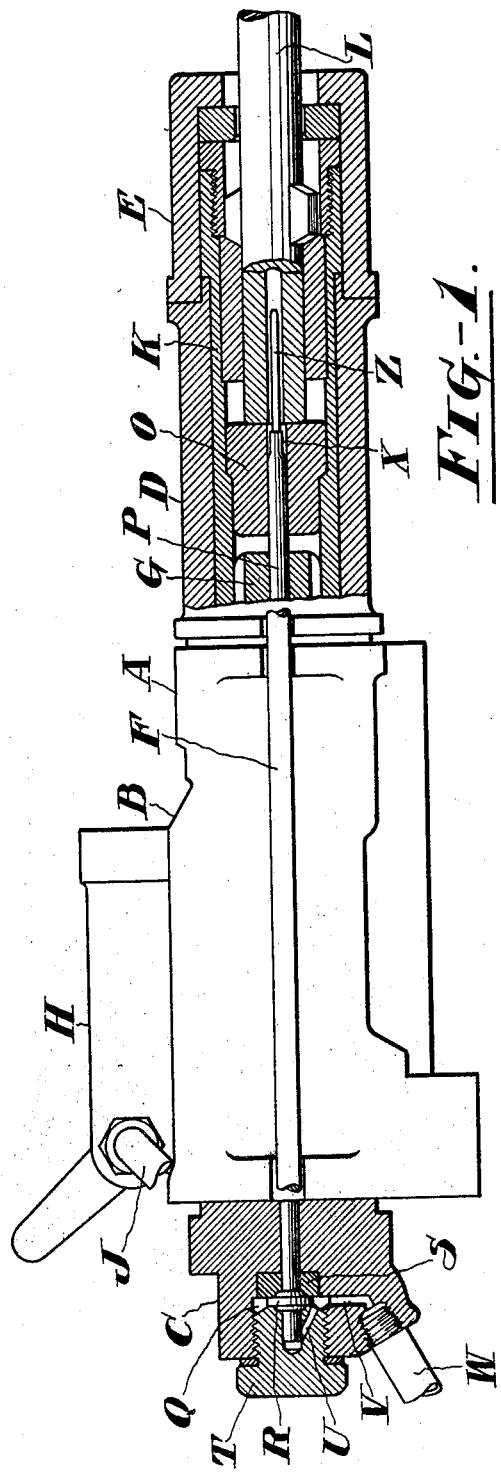
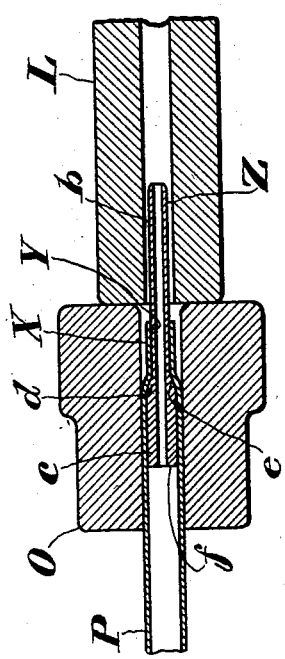
INVENTOR.
Lewis C. Bayles
BY
HIS ATTORNEY.

Patented July 26, 1932

1,868,684

UNITED STATES PATENT OFFICE

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY

CLEANSING FLUID CONVEYING TUBE

Application filed October 26, 1928. Serial No. 315,182.

This invention relates to fluid actuated rock drills, but more particularly to a cleansing fluid conveying tube wherewith rock drills of certain types are equipped for supplying fluid under pressure into a hollow drill steel for the purpose of removing the cuttings from the hole being drilled.

One object of the invention is to protect the tube against such injuries as may be caused by abutting the drill steel against the front or outlet end of the tube as often happens in cases where the chuck parts whereby the hollow drill steel is guided become worn to such an extent that the end of the drill steel may be thrust against the tube during the operation of inserting the drill steel into the drill.

Another object is to render a tube of this type readily applicable for use in various types of drills, as for instance, in drills where it is desirable to introduce only liquid, such as water, into the drill steel, and in others where it is intended to use only pressure fluid for this purpose, and in all cases where it is possible for both hollow and solid drill steels to become intermingled so that a solid drill steel may inadvertently be placed in the rock drill, and in which type of steel no provision has been made for the accommodation of that portion of the tube which extends forwardly of the percussive element of the drill.

Other objects will be in part obvious and in part pointed out hereinafter.

In the drawing accompanying the specification and in which similar reference characters refer to similar parts, Figure 1 is a longitudinal view partly in section of a rock drill equipped with a fluid conveying tube constructed in accordance with the practice of the invention, and Figure 2 is a longitudinal sectional view of the front end of the tube and its nozzle and elements into which the tube extends.

Referring more particularly to the drawing, the invention is shown embodied in a rock drill designated generally by A and comprises a cylinder B at the rearward end of which is a back head C and at the front end a front cylinder extension D. Forwardly of the front cylinder extension D is a front head E which together with the elements heretofore described, form the casing parts of the rock drill and may be clamped together in any suitable manner, as for instance by side bolts F disposed on opposite sides of the drill and only a portion of one of which is shown.

Within the cylinder B and the front cylinder extension D is the usual hammer piston, only the nose or extension G of which is shown. The pressure fluid utilized for actuating said hammer piston may be distributed by suitable valve mechanism (not shown), but the position of which is indicated by a valve chest H into which pressure fluid from a source of supply may be conveyed by a connection J.

In the construction shown the front cylinder extension D and the front head E serve as a housing for chuck mechanism designated generally by K. This chuck mechanism may be of any well known type and serves the function of guiding a drill steel L which extends into the front head E and of transmitting the rotary movement of suitable rotative mechanism (not shown) to the drill steel. Within the chuck mechanism K and interposed between the piston G and the drill steel L is an anvil block O which is slidably guided by the chuck mechanism and serves to transmit the blows of the hammer piston to the drill steel.

In accordance with the practice of the invention, means are provided for conveying cleansing fluid, such as water or air, or as in some cases both water and air, to the working implement or drill steel L through which such cleansing fluid may flow into the drill hole for removing the cuttings therefrom. The means provided for this purpose comprises a tube P which extends through the cylinder B and the front cylinder extension D and into the anvil block O to a point preferably slightly rearwardly of the end of the drill steel L.

The rearward end of the tube P extends through the back head C and into a recess Q in the said back head. The tube P carries in this instance an integral flange R near its rearward end and said flange R is seated on a resilient packing, such as rubber S, disposed in the bottom of the recess Q to form a seal between the recess Q and the percussive element of the drill.

The flange R is in this instance pressed into fluid tight engagement with the packing S by a plug T threaded into the recess Q to bear against the flange. The plug T also serves to convey cleansing fluid through the tube P and accordingly has a passage U which communicates at one end with the rearward end of the tube P and at its other end with a passage V in the back head C. The passage V in turn communicates with a connection W through which the cleansing fluid may be conveyed to the drill from a source of supply.

In the form of the invention illustrated the tube P is provided at its forward end with a restricted portion X thus also restricting the outlet opening Y of the said tube. The outlet opening Y may be of such proportion that whenever it is desired to use the tube P only as a means for conveying pressure fluid to the drill steel, said outlet opening Y may serve as a nozzle. Being restricted as described, the outlet opening Y will direct the pressure fluid issuing therefrom directly into the bore of the drill steel.

In such cases where the presence of water in the chuck mechanism of the drill is not objectionable, the outlet opening Y may also serve as a nozzle for directing water across the space between the tube and the drill steel. Means is provided, however, for conveying cleansing fluid from the tube P into the hollow drill steel L. This means may be in the form of a nozzle Z comprising in this instance a forwardly extending reduced portion $b$ adapted to normally extend into the drill steel L, and a rearward enlarged portion $c$ which lies within the tube P rearwardly of the restricted portion X and has a shoulder $d$ which abuts a seat $e$ in the tube P for limiting longitudinal movement of the nozzle Z with respect to the tube P in a forwardly direction. The peripheries of the reduced and enlarged portions $b$ and $c$ respectively are preferably of such proportions that they will form substantially fluid tight joints with the adjacent surfaces of the tube P. The nozzle Z, it should be understood, however, is disposed slidably within the tube P so that there will be some slight clearance between the surfaces of the nozzle and the tube. This is not objectionable since the shoulder $d$ of the nozzle and the cooperating seat of the tube will effectively prevent the passage of cleansing fluid along the exterior of the nozzle into the chuck mechanism.

As has been previously stated the nozzle Z is adapted to slide within the tube P so that it may be readily moved from one end of the tube to the other. This is a highly advantageous feature particularly when it becomes necessary to substitute a new nozzle for one which may have become unfit for use due to wear or other injury which may occur thereto.

During the drilling operation, however, it is desirable that the nozzle Z should remain constantly in the extreme forward portion of the tube P and, in order to insure this position of the nozzle, said nozzle is provided at its rearward end with a pressure area $f$ against which the cleansing fluid in the tube P may act for constantly holding the nozzle Z in the position described. The bore of the tube P rearwardly of the restricted portion X is of uniform diameter so that the nozzle Z may be readily inserted in the tube from the rearward end of the drill. In this way, whenever it is desired to either equip the tube P with the nozzle Z or to remove the nozzle from the tube, it will only be necessary to remove the plug T in order to gain access to the nozzle.

From the foregoing description the advantages of the invention should be readily apparent to those familiar with the art to which the invention pertains. A few of these advantages, however, may be briefly stated and include that of being able to use the cleansing fluid conveying means either for conveying water or air to a hollow drill steel with or without the use of the nozzle Z and also to permit the use of both hollow and solid drill steels in the rock drill without first removing the fluid conveying tube from the drill.

When inserting a solid drill steel into the front head the end of the drill steel will engage the nozzle Z and move it rearwardly into the tube P. In like manner after the chuck mechanism becomes worn, or if the bore in the drill steel is eccentrically located relatively to the nozzle Z, the end of the drill steel may engage the nozzle and shove it rearwardly into the tube without causing any injury thereto.

I claim:

1. In a fluid actuated rock drill, the combination of a cylinder and front and back heads, a hollow drill steel extending into the front head, a cleansing fluid conveying tube extending through the cylinder and spaced at its front end from the drill steel, means for securing the tube to the back head, a nozzle disposed slidably in the front end of the tube and spanning the space between the tube and the drill steel for conveying cleansing fluid from the tube to the said drill steel, and abutment means associated with the nozzle and the tube and cooperating to limit movement of the nozzle in one direction with respect to the tube and to effect a seal between the nozzle and the tube.

2. In a fluid actuated rock drill, the combination of a cylinder and front and back heads, a hollow drill steel extending into the front head, a cleansing fluid conveying tube extending through the cylinder to a point rearwardly of the drill steel and having a restricted portion at its front end to form a seat, means for securing the tube to the back head, and a nozzle slidable in the tube and extending into the drill steel and having a shoulder to abut the seat for limiting longitudinal movement of the nozzle with respect to the tube in a forwardly direction and to effect a seal between the nozzle and the tube.

3. In a fluid actuated rock drill, the combination of a cylinder and front and back heads, a hollow drill steel extending into the front head, a cleansing fluid conveying tube in the cylinder and the back head, a nozzle disposed slidably in the tube to convey cleansing fluid from the tube to the drill steel, and a holding area on the nozzle against which cleansing fluid acts for holding said nozzle stationary in the tube.

4. In a fluid actuated rock drill, the combination of a cylinder and front and back heads, a hollow drill steel extending into the front head, a cleansing fluid conveying tube in the cylinder and the back head and extending to a point rearwardly of the drill steel, means for securing the tube to the back head, a nozzle disposed slidably in the tube and extending into the drill steel for conveying cleansing fluid from the tube into said drill steel, a shoulder on the nozzle, a seat in the tube forming an abutment for the shoulder, and a holding area on the end of the nozzle exposed to the pressure of the cleansing fluid for holding the nozzle against the seat.

5. In a fluid actuated rock drill, the combination of a cylinder and a front head, a hollow drill steel extending into the front head, a tube extending through the cylinder for conveying cleansing fluid and having a seat therein, and a nozzle in the tube for conveying the cleansing fluid from the tube into the drill steel and having a shoulder to cooperate with the seat for forming a fluid tight joint between the nozzle and the tube.

In testimony whereof I have signed this specification.

LEWIS C. BAYLES.